INVENTOR.
Alfred W. Hopton,
BY
Albert R. Henry
ATTORNEY

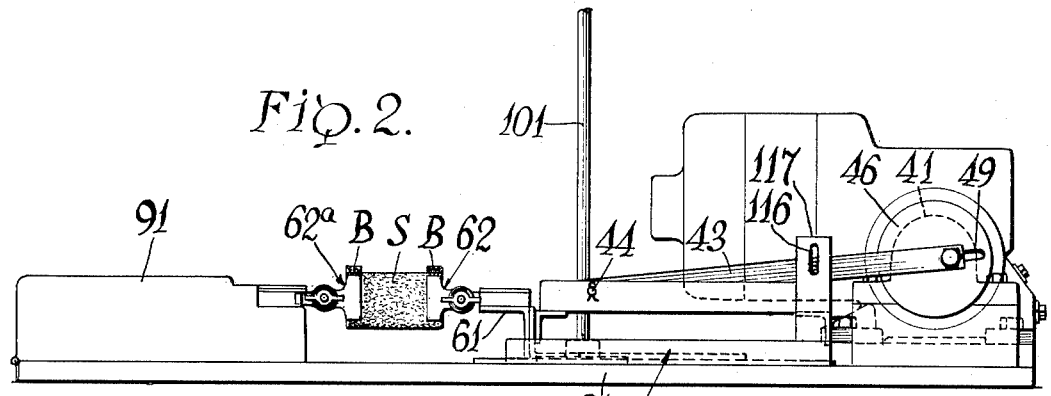
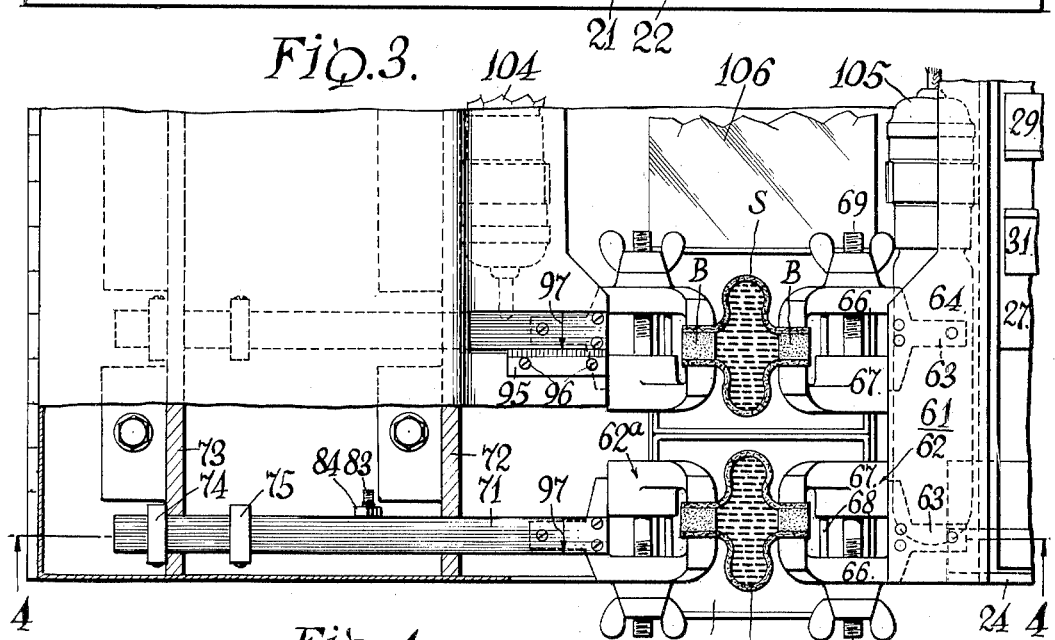
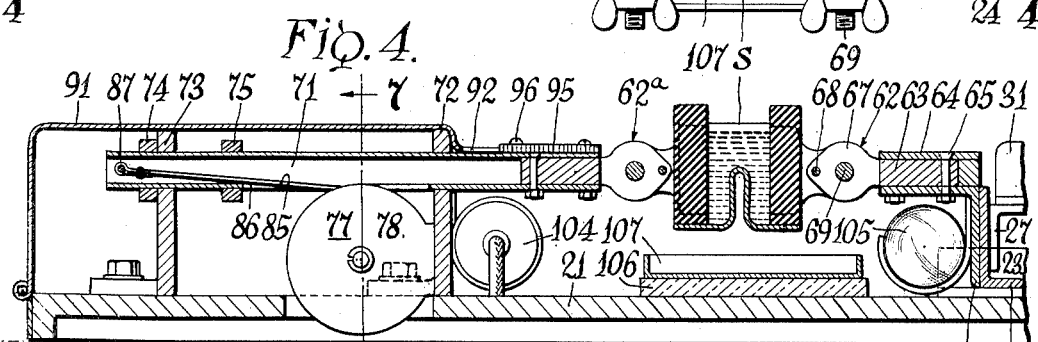
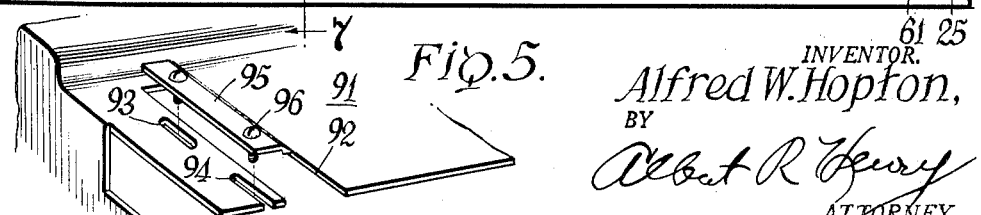
INVENTOR.
Alfred W. Hopton,
BY
Albert R. Henry
ATTORNEY.

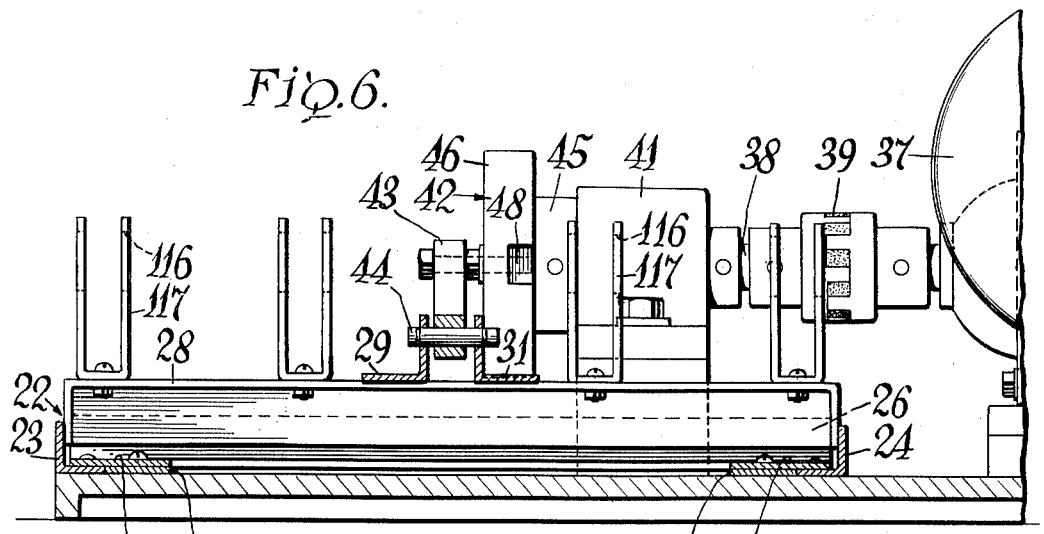
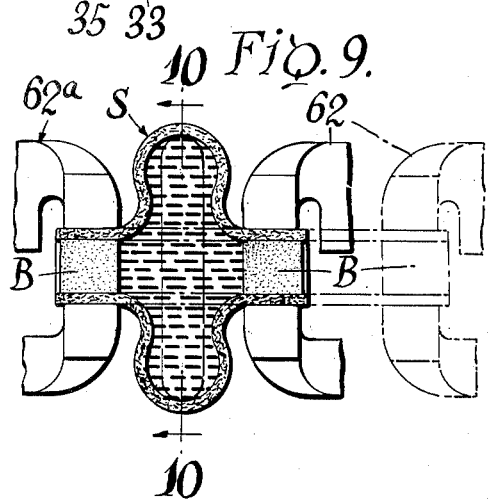
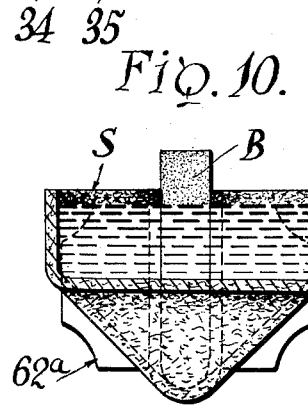
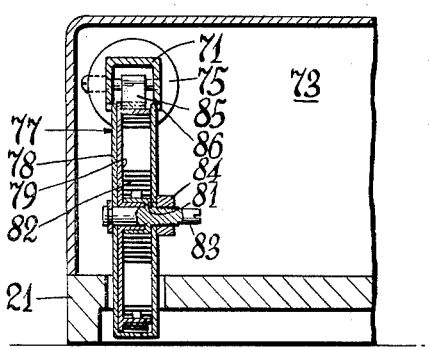
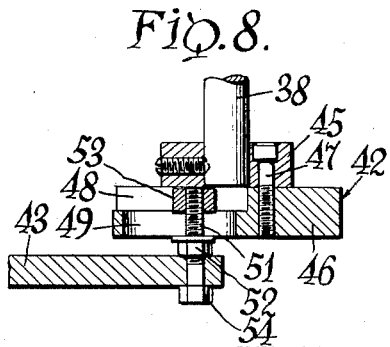

United States Patent Office 2,719,429
Patented Oct. 4, 1955

2,719,429

MACHINE FOR TESTING LEATHER AND OTHER FLEXIBLE MATERIALS

Alfred W. Hopton, Niagara Falls, N. Y.

Application August 11, 1952, Serial No. 303,666

4 Claims. (Cl. 73—100)

This invention relates to a machine for testing leather and other flexible materials for such properties as bending, water and abrasion resistance, and it has for its major object the provision of a machine which is easily manipulated and which will give results that can be correlated with and evaluated for the durability of the material in actual service.

A need has heretofore been recognized for a testing machine which can operate on a test specimen, such, for example, as shoe leather, in such manner as to make it possible to predict the life of the shoe under service conditions. One particular application has been with military boots, which are subject to extremely severe and various conditions in the field. The large numbers of articles which must be made available, the problems of supply, and the interference with military operations in the event of premature failure, indicate the necessity of reliable methods of predetermining the reasonable life expectancy, and the probable advantages of proposed improvements in tanning, stuffing, and other manufacturing operations.

The ability of shoe upper leather to withstand repeated flexing is one property of interest in evaluating the stock. Another property is the ability of the finished leather to withstand water penetration, and at the same time permit the wearer's feet to "breathe," that is, permit perspiration vapors to pass through the leather from the inside out, while resisting the infiltration of liquid water from the outside to the inside. Such ability may be a function of the stuffing composition used to impregnate the pores of the leather, and hence a test for this particular property is a test of the composition itself, under the conditions of its environment. Resistance to rubbing and abrasion is, of course, another property which merits laboratory evaluation.

Other materials, such as lighter leathers for gloves and other articles of apparel, synthetic or rubberized fabrics for raincoats and other uses, natural fiber fabrics using various types of sizing or loading agents, are additional examples of materials whose properties should be known without resorting to long term life tests, in order to predict their suitability for a given purpose.

The present invention provides a machine which may be used in the laboratory to obtain data from which the foregoing properties may be estimated in terms of service life. Particular features of the present invention are its adaptability to samples of materials of specifically different properties, ease of operation, adjustability to compensate for variations in the material under test, and ability to complete a test in a relatively short period of time. Other features and advantages will appear as this description proceeds.

A typical embodiment of the invention is illustrated in the accompanying drawing, wherein:

Fig. 2 is a side elevation of the machine of Fig. 1;

Fig. 3 is an enlarged fragmentary plan, with portions broken away;

Fig. 4 is a section on the line 4—4 of Fig. 3;

Fig. 5 is a fragmentary perspective showing an adjustable scale element;

Fig. 6 is an enlarged section on the line 6—6 of Fig. 1;

Fig. 7 is a fragmentary section on the line 7—7 of Fig. 4, showing particularly a pressure maintaining and equalizing means;

Fig. 8 is a section through an eccentric driving member, showing the means for adjusting the throw;

Fig. 9 is an enlarged view of a test specimen and clamping jaws therefor, showing the location of the reciprocable jaws in dotted lines;

Fig. 10 is a section on the line 10—10 of Fig. 9; and

Figure 1:
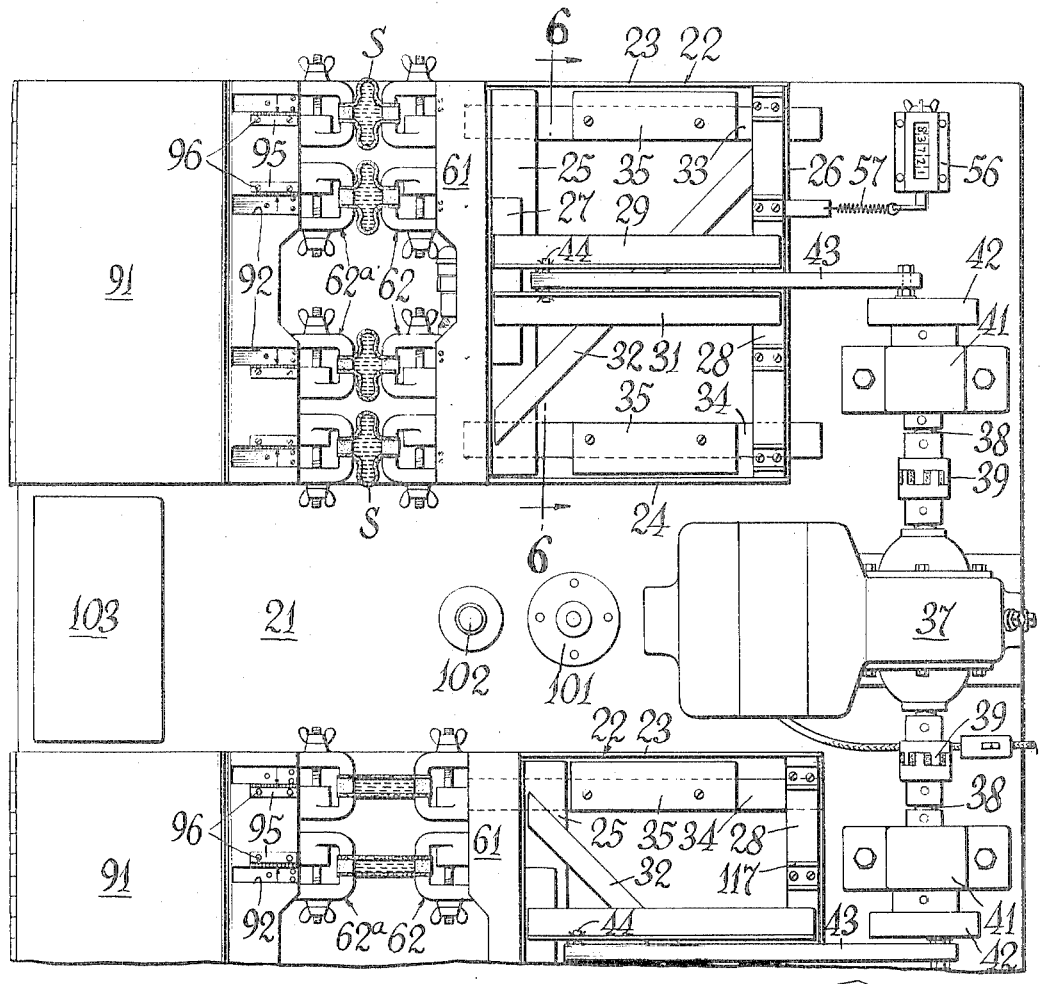
Fig. 1 is a plan of a multiple specimen machine, with a portion broken away.

The present machine comprises a table top or platform 21, on which are mounted a pair of horizontally reciprocable frames, generally designated by the reference numeral 22. The frames and their associated parts are alike, and in Fig. 1 the lower portion has been broken away so that only about half of it is illustrated. Each frame 22 comprises spaced side rails 23, 24 which may be formed of angle iron, and cross rails 25, 26 which are welded or otherwise secured thereto. A relatively short inverted angle 27 is secured to the inner face of the rail 25, and another inverted angle 28 is secured to the frame adjacent the rail 26. These inverted angles are interconnected by a pair of slightly spaced angles 29 and 31, and the frame is squared and held true by a diagonal brace 32. The frame 22 is mounted on the platform 21 by a pair of spaced parallel guides 33, 34, engaging the inner edges of the rails 23 and 24, and it is restrained from vertical movement by plates 35 secured to the guides and overlapping the bottom flanges of the rails 23 and 24.

The frames 22 are reciprocated by a drive including a motor and preferably variable speed reduction unit 37 having a double ended output shaft to which are connected drive shaft 38 through couplings 39. The shafts 38 are journaled in bearings 41, and their outboard ends are connected to adjustable cranks or eccentrics 42, which in turn are connected to rods 43, whose outer ends are pivoted on pins 44 mounted between the angles 29 and 31. As shown in Fig. 8, each crank 42 comprises a collar 45 concentrically secured to the end of the shaft 38, and also to a disc 46 by means of screws 47. The disc 46 is formed with a radial slot 48 overlying an aperture 49 of less width than the slot. A threaded crank pin 51 is retained on the disc by means of a nut and washer 52 disposed on the outer face of the disc, and a nut 53 prositioned in the slot 48 and abutting the shoulders formed at the junction with the aperture 49. The connecting rod 43 is retained on the crank pin by a nut 54. It will be apparent that the pin 51 may be locked at various distances from the axis of the shaft 38, thereby to adjust the throw and the displacement of the frame 22. A counter 56, mounted on the table 21 and connected to the frame by a spring 57, records the number of strokes made during the operating period.

The head end of each frame 22 is provided with an outwardly projecting angle ledge 61 secured to the cross rail 25. The ledge serves as a support for a number of clamps 62 whose shanks 63 are positioned in spaced relation along the ledge, and are retained in sockets formed in a cover plate 64, and detachably secured by screws 65. The clamps 62 are essentially small vises, each having a fixed jaw 66, and a movable jaw 67 guided on a pin 68 and a dovetail keyway, not shown, formed at the base of the jaw and shank. An adjusting screw and nut 69 controls the opening and closing of the clamp.

The clamps 62 are positioned with their jaws disposed in vertical planes, and each frame 22 is of sufficient size to accommodate four clamps, in the embodiment of the invention herein illustrated. Thus, the complete machine can test eight specimens simultaneously, or fewer as desired. It will be noted also from Fig. 1 that the frames 22 are connected to the drive shafts 38 one hundred and eighty degrees out of phase, so that one frame is advancing while the other is receding.

A relatively fixed set of clamps 62a is positioned in aligned relation with the clamps 62, and as the elements of the second set of clamps are the same as the first, no change in reference numerals is required in designating the parts. The shanks of the clamps 62a are positioned in square tubes 71, mounted for horizontal adjustment or limited movement in suitably located apertures formed in spaced upright supporting plates 72 and 73, which are bolted to the table 21. Spaced stop collars 74 and 75 are positioned on the tubes 71, on either side of the plate 73. As shown in Figs. 3 and 4, the collar 74 abuts the plate 73 and thus limits movement of the tube 71 toward the frame 22, but the collar 75 is spaced from the plate 73, and therefore movement away from the frame is possible. It will be apparent that the collars may be set to prevent any movement of the tube 71, or locate it at any desired distance from the frame 22, or vary the permissible movement of the tube and associated clamp. It will also be apparent that the tubes 71 constitute extensions of the shanks of the clamps 62a.

Adjustable means are provided to hold the collar 74 against the plate 73 with a predetermined amount of tractive force, and thus require the imposition of a minimum thrust axially of the tube 71 before it will recede from the frame 22. As shown in Figs. 4 and 7, such means comprises a reel 77 of known type, having a fixed outer casing 78 mounted on the plate 72, within which is a movable inner casing 79. A fixed hub element 81 has one end of a spiral spring 82 secured thereto, and the other end of the spring is connected to the periphery of the movable casing 79. An adjusting screw 83 extends through the hub and is locked by a nut 84. The tension in the spring 82, and the torque required to rotate the inner casing, may thus be governed. The inner casing also carries a few turns of a pull tape 85, the end of which passes through a slot 86 in the tube 71, for connection to a pin 87 at the tube's end. The tube 71 may therefore be moved rearwardly, provided the magnitude of the thrust on the tube is slightly greater than the force tending to pull the tape 85 into the reel.

A hinged cover 91 is pivoted to the edge of the platform 21, and during operating periods it is positioned over and on the plate 72 and 73. The front edge of the cover is formed with slots 92 to provide clearance for the forward or clamp ends of the tubes 71. It is also formed with slots 93 and 94 over which is located a longitudinally movable scale 95, retained by screws 96. The tubes 71 are scored on their upper surfaces with index marks 97, and hence the distance between the clamps 62 and 62a may be readily measured, as well as the movement of the tube 71 rearwardly, when adjustment is made to permit such movement.

Certain auxiliaries are shown in Figs. 1 and 2, comprising a standard 101 which may be used to support an overhead lamp, or burette clamp, a rheostat 102 for controlling the motor speed, and a parts or instrument box 103. The test area, between the clamps 62 and 62a is illuminated by elongated lamps 104 and 105. A mirror 106 enables the operator to see underneath test specimens, and small trays 107 may be provided to catch any drippings.

It will now be understood that test specimens S of flexible material may be clamped between the pairs of vises 62 and 62a, and, as the frames 22 are reciprocated, such specimens are flexed or bent, until some form of failure appears. This may be in the development of cracks in the material itself, or in a surface coating on the material.

In the particular test illustrated in the drawings, the objectives are to evaluate the properties of leather suitable for shoe uppers, and particularly its resistance to water penetration, as well as flexure.

Pieces of leather, about three inches square, are cut from the hide, and are bent on themselves with the flesh side out. They are then inserted between the pair of clamps, with rubber filler blocks B disposed inside and between the clamp jaws. For specimens of this size and nature, it has been found that the maximum spacing of the clamp jaws, when the frame 22 is retracted, should be about one and three quarters inches, and adjustment of the stroke, and the location of the tubes 71, are made as required. It has also been observed that pieces of leather cut from the same hide will vary in their flexibility, depending upon distance from the back bone region, thickness, etc. Therefore a number of samples should be run to obtain a fair average value for the piece under examination.

The frames are then reciprocated by hand, which can readily be done by loosening the set screw on the coupling 39, and an examination is then made for uniformity of applied compressive force on the several specimens. As shown in the enlarged views of Figs. 9 and 10, the leather is flexed and bent as the clamp 62 approaches the clamp 62a, with the imposition of a compressive force on the leather. It may be assumed that the reels 77 are set to release at about eight pounds, so that, if the compressive force on the leather exceeds this value, the relatively fixed clamp 62a and the tube 71 will be pushed back. If the force exerted on the specimen is less, the clamp of course will not be moved. Suitable adjustments of the stops 74 and 75 are made, so that the flexing effort on each specimen is substantially equalized, and one source of potential error eliminated.

The cupped samples, sealed at their ends by the pressure of the clamp jaws on the rubber inserts, are then partially filled with water, and the frames 22 are set in motion. The time of the test, and number of strokes, may be recorded on a suitable log sheet, as well as other observations. If the leather is unstuffed, beads of water will appear on the outside of the specimen in a matter of seconds. These can be readily observed in the mirror 106. Specimens which have been lightly filled with stuffing may run a few minutes before penetration occurs, and other specimens, stuffed with a high grade water resistant composition, will resist penetration for a longer period of time.

The flexing of stuffed leathers will also result in the squeezing out of the composition, which may be observed to form a paste on the inside of the specimen, thus giving another index to quality. The flexing action may be continued until the leather begins to show cracks, and, when indicated, the adjustments may be made to subject the specimen to a positive tensile force, as well as compression.

Dry specimens may, of course, be subjected to test, and under wet testing conditions, the samples may be loaded with oils, greases, suspensions of mud, or whatever chemical may be desired. The test just outline is, of course, simply illustrative of the nature of examinations which may be made with the machine. It may also be noted that the conditions just outlined closely simulate service conditions. That is, with the frames 22 reciprocating at about sixty cycles per minute, and with the settings stated, the flexure on the test specimen is such as to provide a greatly accelerated life test of the shoe in active use.

Figure 11:
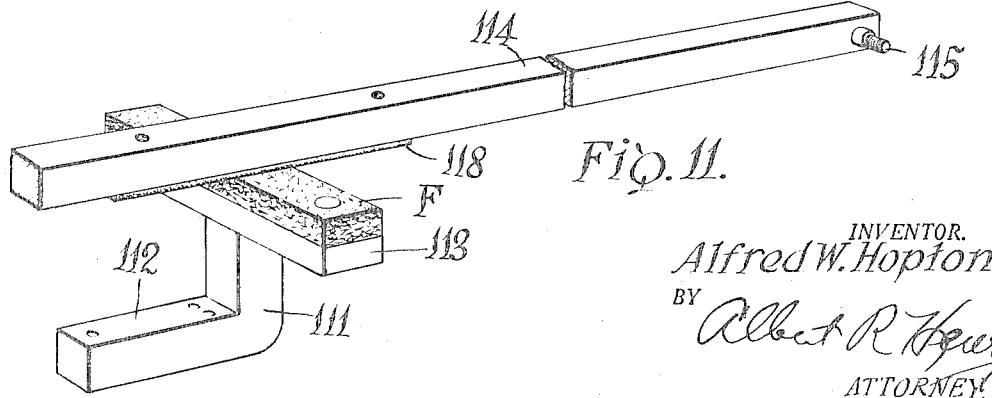
Fig. 11 is a perspective of a pair of fixtures employed in conducting an abrasion test.

It will be obvious that other materials, such as cloth, plastics, paper, and the like may also be tested, suitable adjustments being made for the nature of the specimens. The machine may also be employed for testing resistance to abrasion. For this purpose, the attachment shown in Fig. 11 may be employed. An upright post 111 having a right angled shank 112 is inserted in the end of the tube 71, replacing the clamp 62a. The post 111 is equipped with a cross piece 113, on which may be secured the specimen F. A square rod 114 is pivotally mounted, by means of a stud 115, in slots 116 formed in a bifurcated upright bracket 117, mounted on the angle 28 on the back of the frame 22. The under surface of the rod carries a length of abrasive material 118, and the dimensions are such that the abrasive may rub over the specimen with substantially plane contact.

The rod 114 may be weighted, so that the pressure on the specimen may be increased as desired. One advantage of the present attachment is that it may be readily set up, requires only a small test specimen, and gives reproducible results. In the form shown, the length of the stroke is greater than the width of the specimen, with the result that dust can clear itself, and the building up of corns is minimized. It will be obvious that both abrasion and flexing tests may be made simultaneously by applying the attachment to less than all of the test stations.

While the invention has been described with reference to a single embodiment, it will be understood that it is not limited thereto, but is susceptible of numerous modifications without departure from its principles. It is accordingly intended that the invention be given a scope commensurate with that expressed by the following claims.

I claim:
1. A machine for testing flexible material comprising a platform, a frame having a head end horizontally mounted on the platform for reciprocable movement in a straight line and in a single plane throughout the displacement thereof, drive means for the frame, a first plurality of spaced clamps positioned on and transversely of the frame at the head end thereof, said clamps having relatively movable parallel jaws disposed in vertical planes, said jaws being elevated above the platform and being adjustable toward and away from each other transversely of the direction of reciprocation of the frame, a second plurality of transversely spaced clamps mounted on the platform in aligned relation with the first clamps and also spaced therefrom in the direction of reciprocation and from the head end of the frame, said second clamps also having relatively movable parallel jaws disposed in vertical planes and adjustable with respect to each other transversely of the direction of reciprocation of the frame, said first and second plurality of clamps providing a plurality of aligned pairs, whereby folded test specimens may be secured between pairs of aligned clamps to form cups or pockets open at the top and capable of retaining liquid therein during an entire displacement cycle of the frame, and means on the platform for individually and adjustably mounting said second plurality of clamps toward and away from the first plurality of clamps.

2. A machine as set forth in claim 1, wherein the drive means for reciprocating the frame includes means for varying the displacement thereof, and wherein a scale and pointer is mounted on the platform adjacent the second plurality of clamps to reflect the spacing of the clamps of said pairs resulting from the variations of the displacement of the frame and adjustment of the second clamps.

3. A machine for testing flexible material for durability under repeated flexure comprising a platform, a frame having a head end reciprocably mounted on the platform for movement thereover in a straight line and in a single plane, drive means for reciprocating the frame, a specimen retaining clamp connected to the frame at the head end thereof, said clamp having relatively movable parallel jaws adjustable in a direction transversely of the direction of reciprocation of the frame, a relatively stationary support mounted on the platform in spaced relation to the head end of the frame, a second clamp having an elongated shank mounted on the support for sliding movement toward and away from the first clamp and in alignment therewith, said second clamp having vertical parallel jaws adjustable toward and away from each other in a direction transversely of the direction of reciprocation of the frame, stop means between the shank and support for positioning the second clamp and positively limiting permissible movement thereof, and yieldable means connected between the second clamp and support to retain the second clamp in relatively fixed position with respect to the support and to enable the second clamp to have sliding movement within the limits fixed by the stop means in proportion to thrusts imposed on the second clamp through the motion of the frame and transmitted through a specimen held by and between the first and second clamps.

4. A machine as set forth in claim 3, wherein the support for the second clamp comprises spaced bearing plates and the shank of the second clamp is slidably mounted in said plates, and the stop means between said shank and supports comprises adjustable stop collars mounted on said shank and adapted upon abutment against at least one of said plates to positively limit permissible movement of the second clamp.

References Cited in the file of this patent

UNITED STATES PATENTS

| | | |
|---|---|---|
| 1,344,301 | Jury | June 22, 1920 |
| 1,581,215 | Kobin | Apr. 20, 1926 |
| 2,113,290 | Benjamin | Apr. 5, 1938 |
| 2,650,493 | Bowen, Jr., et al. | Sept. 1, 1953 |

FOREIGN PATENTS

| | | |
|---|---|---|
| 700,171 | France | Dec. 22, 1930 |

OTHER REFERENCES

National Bureau of Standards Technical News Bulletin, vol. 37, No. 12, Dec. 1953.